No. 613,061. Patented Oct. 25, 1898.
J. DUSTIN & P. E. BELLOWS.
HOSE COUPLING.
(Application filed June 7, 1897.)

(No Model.)

Witnesses
Jesse C. Blake
E. Behel

Inventors:
John Dustin
Perry E. Bellows
By A. O. Behel atty.

UNITED STATES PATENT OFFICE.

JOHN DUSTIN AND PERRY E. BELLOWS, OF BELOIT, WISCONSIN.

HOSE-COUPLING.

SPECIFICATION forming part of Letters Patent No. 613,061, dated October 25, 1898.

Application filed June 7, 1897. Serial No. 639,770. (No model.)

*To all whom it may concern:*

Be it known that we, JOHN DUSTIN and PERRY E. BELLOWS, citizens of the United States, residing at Beloit, in the county of Rock and State of Wisconsin, have invented certain new and useful Improvements in Hose-Couplings, of which the following is a specification.

The object of this invention is to unite the ends of a hose in such a manner as not to reduce the size of the passage-way between the sections of hose, and also of such construction that hose varying in thickness may be united without forming a depression in the outer surface of the hose.

Figure 1:
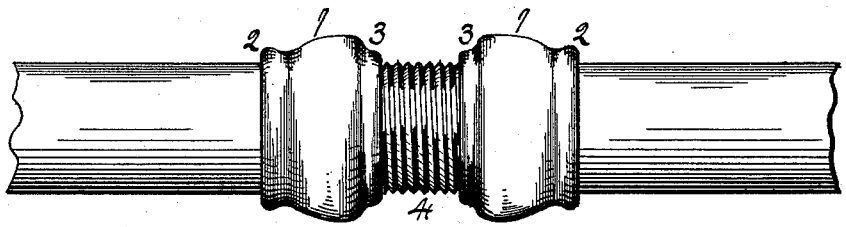
Figure 2:
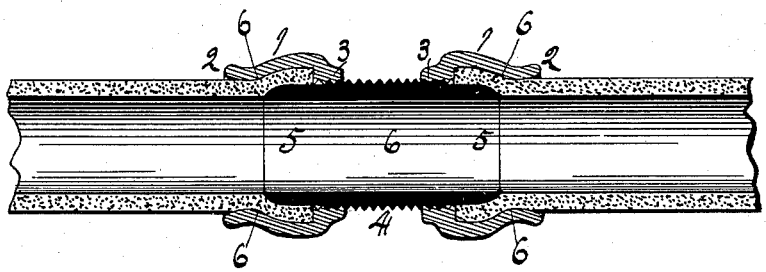
Figure 3:
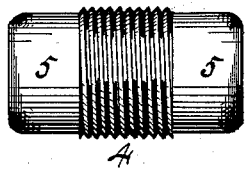

In the accompanying drawings, Figure 1 is a representation of two sections of hose connected by our improved coupling. Fig. 2 is a lengthwise section of the same. Fig. 3 is a representation of the center portion of the coupling.

In uniting the ends of the hose when a break has occurred or an extra length is required it is very essential that the opening of the coupling shall at least be as large as the inner diameter of the hose in order that a free passage to the water may be formed. It is also essential that the coupling be of such conformation that hose of different thickness can be united without indenting the outer surface of the hose, which will enable the withdrawal of the hose from the coupling after long use and after the hose has become set and hardened.

In uniting two pieces of hose where a break has occurred or to obtain an increased length two sleeves 1 are employed, one for the end of each section of the hose. The inner diameter of the sleeves at the ends 2 in which the hose is inserted is larger than the outside diameter of the hose, and gradually decreasing in size until about equal to the outside diameter of the hose in order that the hose may be easily inserted. From the smallest diameter of this end of the sleeve its inside diameter increases until enlarged about the thickness of the hose, this enlargement being gradual. The end 3 of the sleeve is internally screw-threaded.

The center portion of the coupling employed to unite the sleeves consists of a center screw-threaded section 4 and two ends 5 of a uniform diameter, having their outer ends rounded. This center portion has a central opening 6 of the same diameter as the inside diameter of the hose. The ends of the hose are placed in the sleeves, and one end of the center portion is inserted into the screw-threaded end of the sleeve and into the end of the hose, when the screw-threaded portion of the center portion engages the screw-threaded end of the socket, and by turning the center portion into engagement with the sleeve its end will be forced into the end of the hose, thereby expanding it and pressing its outer surface at the point 6 against the inner surface of the sleeve until a water-tight joint is formed. The other section of hose is securely joined to the outer end of the center portion.

Should the coupling spring a leak, it may be remedied by tightening up the coupling. If the hose to be united be thinner than the usual make, the center portion of the coupling will extend farther into the sleeve until a tight joint is formed.

By this construction of coupling the hose is pressed or clamped at the point 6 only, and as the inner surface of the sleeve is enlarged the hose can be readily removed, which is not the case where a depression is formed in the outer surface of the hose, the opening in the sleeve being smaller than the outside diameter of the hose.

We claim as our invention—

In a hose-coupling, the combination of the sleeve 1, having a central opening, one end 3 being internally screw-threaded the end 2 being rounded and flaring, and the wall 1 in its internal surfaces in lengthwise section in the form of an ogee, a portion having a screw-threaded section 4, a smooth extension 5 of uniform diameter having its end rounded, the screw-threaded section engaging the screw-threaded portion of the sleeve so that the rounded end of the extension 5 will pinch the hose against the ogee wall of the sleeve.

JOHN DUSTIN.
PERRY E. BELLOWS.

Witnesses:
F. F. LIVERMORE,
GEO. M. APPLEBY.